United States Patent [19]

Mountz

[11] 3,986,317
[45] Oct. 19, 1976

[54] HEAVY DUTY STAKE RACK CONNECTORS

[75] Inventor: Elton E. Mountz, Morgantown, Pa.

[73] Assignee: Morgan Trailer Manufacturing Co., Inc., Morgantown, Pa.

[22] Filed: July 17, 1975

[21] Appl. No.: 596,595

[52] U.S. Cl. .............................. 52/753 C; 403/407; 403/231; 296/3; 403/331; 52/582; 52/285
[51] Int. Cl.² ......................................... F16B 7/00
[58] Field of Search .......... 403/231, 119, 406, 157, 403/407, 182, 49, 331, 187, 189, 190, 191, 217; 16/168, 171; 52/753 C, 753 D, 753 T, 758 D, 582, 285; 256/25, 26; 160/229, 231, 235, 231 A; 296/3, 8

[56] References Cited
UNITED STATES PATENTS

| 1,357,819 | 11/1920 | Peelle .............................. 160/232 |
| 2,866,997 | 1/1959 | Eskridge et al. ...................... 16/171 |
| 3,815,877 | 6/1974 | Turner ............................. 256/25 X |

FOREIGN PATENTS OR APPLICATIONS

| 501,152 | 6/1930 | Germany ........................... 403/182 |

Primary Examiner—Wayne L. Shedd
Attorney, Agent, or Firm—Z. T. Wobensmith, 2nd; Z. T. Wobensmith, III

[57] ABSTRACT

Heavy duty stake rack connectors for joining of racks for flat bed trucks and trailers which racks have upright portions engaged in hollow sockets of the truck or trailer bed are provided. The connectors may be formed as extrusions and operate as pairs of male and female connectors one at each end of the rack. The female connectors have U-shaped portions for the reception of vertical ribs from male connectors. Both connectors are symmetrical which avoids the necessity for right and left hand connectors. If desired, a portion of the male connector may be removed to provide a hinge pin on one side and a like portion of female connector at the opposite end of the racks removed permitting the rack to be swung away from an adjacent rack after vertical displacement and disengagement of its uprights from their sockets. The racks can be of picket or solid wall construction.

8 Claims, 7 Drawing Figures

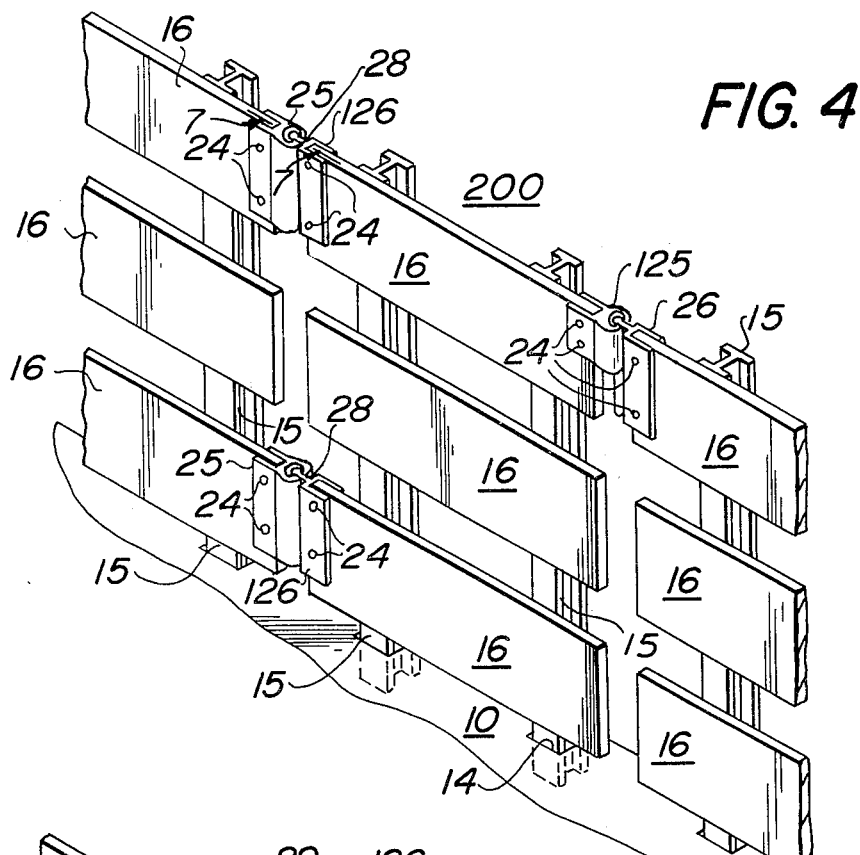
FIG. 4
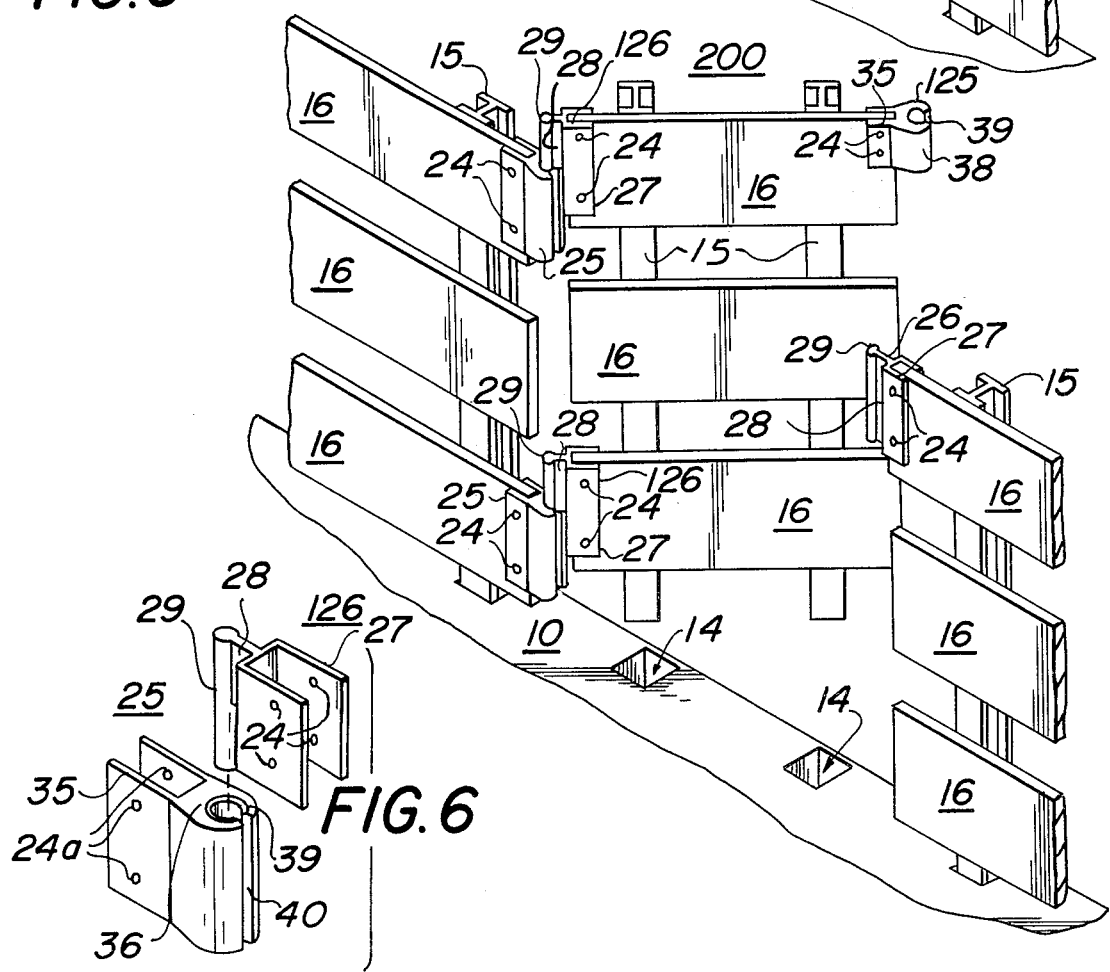
FIG. 5
FIG. 6

HEAVY DUTY STAKE RACK CONNECTORS

BACKGROUND OF THE INVENTION

1. Field of the Invention

Heavy duty stake rack connectors are provided of the extrusion type with vertical interlocking male and female portions.

2. Description of the Prior Art

Racks for use with flat bed trucks and trailers have been available for some time. A major problem encountered with such racks is in connecting them together so that they are securely retained but readily dismountable when desired, and so that intermediate racks can be easily removed for access to a selected part of the cargo.

Most of the connectors available do not permit of easy separation and removal of racks and require sequential removal of racks from the front rack rearwardly in order to remove an intermediate rack. In addition, the connectors available do not provide any simple way of constructing beds as desired of lengths of nine, twelve, fourteen, sixteen, eighteen, twenty, twenty-two and twenty four feet, as now undertaken, requires some twenty three different sizes of racks whereas by using the connectors of my invention only four sizes of racks are required to make up these various lengths.

Examples of available racks and connectors are illustrated in the U.S. Pats. to Jewell, No. 2,638,375, Black, No. 3,022,106, Cohen, No. 2,164,448, Black, No. 3,010,755, and Standish, No. 1,905,009. While these structures operate satisfactorily they are limited in use, requiring many sizes of racks to provide a wide size range, do not provide for use of one rack as a swinging gate for cargo access and suffer from other problems.

SUMMARY OF THE INVENTION

This invention relates to heavy duty stake rack connectors for detachably fastening together racks used at the ends and sides of flat bed trucks and trailers which racks have upright portions engaged in sockets in the truck or trailer bed. The connectors for the racks are symmetrical pairs of extrusions one female and one male at opposite ends of each rack with the female connectors each having a U-shaped opening for reception of a vertical rib from the male connectors. A portion of a male connector may be removed to provide a hinge pin and a like portion of female connectors at the opposite end of the rack to permit the rack to be raised and swung away from an adjoining rack thus providing a gate for cargo access.

The principal object of the invention is to provide heavy duty stake rack connectors which are easy to manufacture, sturdy and of long service life.

A further object of the invention is to provide heavy duty stake rack connectors which considerably reduce the number of sizes of racks which are required to construct varying sizes of trucks and trailer beds.

A further object of the invention is to provide heavy duty stake rack connectors which permit the racks to be used interchangeably on either side of the truck or trailer bed.

A further object of the invention is to provide heavy duty stake rack connectors which can be used with racks of picket like construction or of solid panel construction and which form a leak proof structure when used with solid panel structure.

A further object of the invention is to provide heavy duty stake rack connectors wherein the connectors can be used as a hinge to permit one rack to be swung open for access without the necessity for complete removal of the rack from the truck or trailer bed.

Other objects and advantagous features of the invention will be apparent from the description and claims.

DESCRIPTION OF THE DRAWINGS

The nature and characteristic features of the invention will be more readily understood from the following description taken in connection with the accompanying drawings forming part hereof, in which:

FIG. 3 is an exploded perspective view illustrating a pair of connectors of my invention;

FIG. 4 is a fragmentary perspective view of the connectors of my invention illustrating another embodiment;

FIG. 5 is a view similar to FIG. 4 illustrating the connectors of my invention in another operating position;

FIG. 6 is an exploded perspective view similar to FIG. 3 but illustrating another embodiment of rack connectors; and FIG. 7 is a vertical sectional view, enlarged, taken approximately on line 7—7 of FIG. 4.

Figure 1:
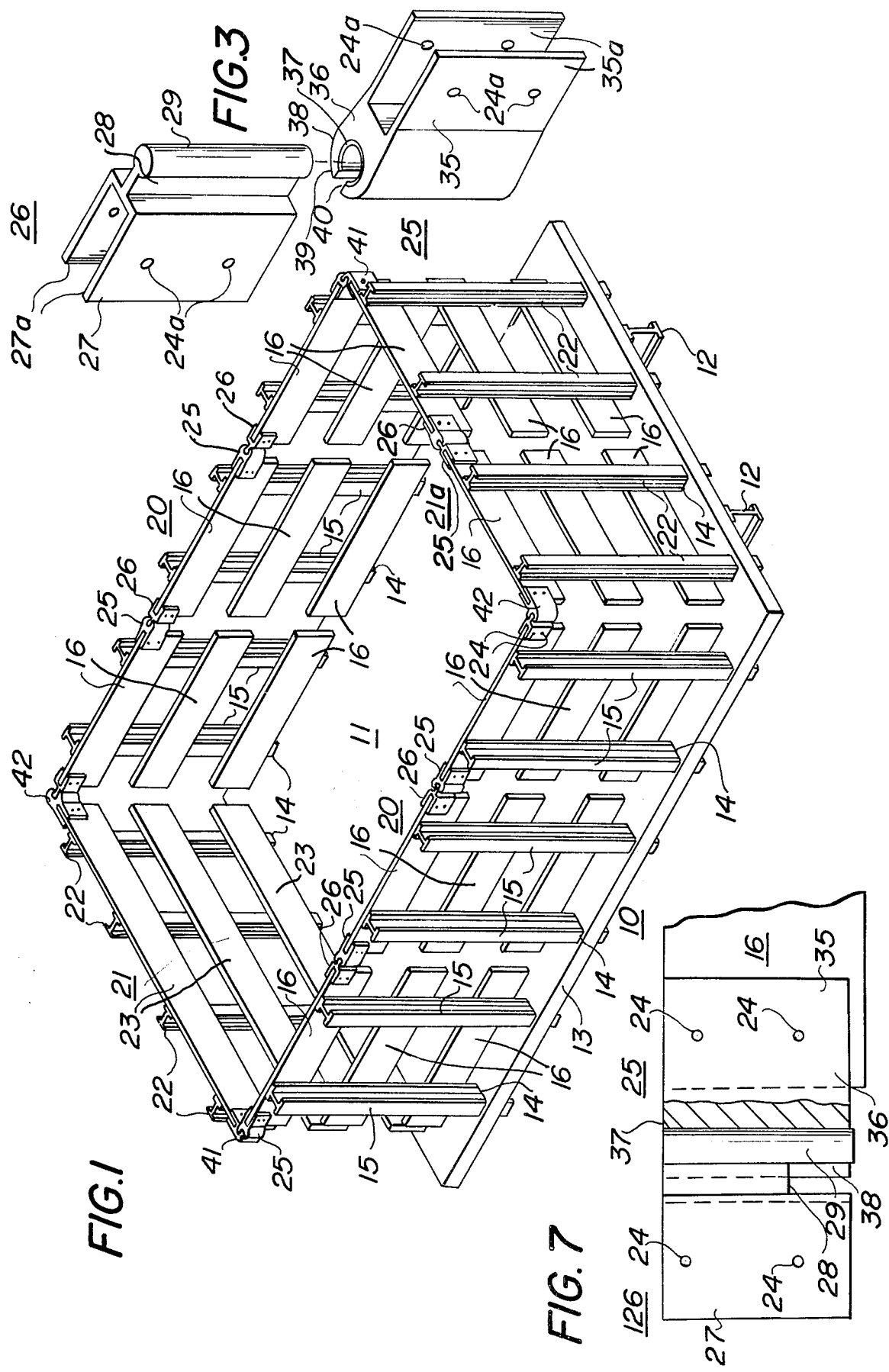
FIG. 1 is a view in perspective illustrating one embodiment of the rack connectors of my invention as installed.

It should, of course, be understood that the description and drawings herein are illustrative merely and that various modifications and changes can be made in the structure disclosed without departing from the spirit of the invention.

DESCRIPTION OF THE PREFERRED EMBODIMENTS

Referring now more particularly to the drawings, and to FIGS. 1 to 3 and 7 thereof, a truck or trailer bed 10 is therein illustrated of conventional type which includes a flat horizontal top 11 supported by two I-beams 12 running beneath and lengthwise of the bed to permit of attachment to a frame of a truck or trailer (not shown) in a well known manner.

The top 11 has a rail 13 around the perimeter which has sockets 14 therealong which can be spaced on thirty and forty two inch centers. The sockets 14 are illustrated as having vertical post members 15 engaged therewith. The vertical post members 15 are connected to horizontal boards 16 which boards are spaced apart vertically on the post members 15.

The post members 15 and boards 16 form racks 20 which can be of the order of four, five or eight feet long. These lengths permit of making the truck or trailer bed in a range from nine to twenty four feet long by utilization of an appropriate number of racks 20 of the three selected sizes, thus reducing the number of different parts required.

Racks 21 and 21a are shown at the front and rear of the bed 10, the front rack 21 extending the width of the bed with vertical post members 22 engaged in sockets 14 and horizontal board members 23 connecting them together and spaced vertically on post members 22. The rear rack 21a is made in two parts with connectors 25 and 26 therebetween.

Referring now to the rack 20 and 21a each end of the top board 16 has one half of a pair of connectors 25 and 26 attached thereto, the connector 25 being of the female type and the connector 26 being of the male type. The male connector 26 is shown in more detail in FIG. 3, and includes a U-shaped portion 27 with spaced parallel walls 27a for engagement with the outer faces at one end of a topmost board 16 and with horizontally aligned pairs of holes 24a for the reception of rivets 24 for attachment to one end of the topmost board and has a central flange 28 connected to a cylindrical rib portion 29 extending from the flange 28.

The female connector 25 is illustrated in more detail in FIG. 3 and has a U-shaped portion 35 with spaced parallel walls 35a for engagement with the outer faces of the topmost board 16 and with horizontally aligned pairs of holes 24a for the reception of rivets 24. The connector 25 has a central integral body portion 36 with wings 38 extending forwardly from the central body 36 and having an opening 39 therebetween to receive the rib portion 29 of a connector 26 and with a slot 40 to receive the flange 28. A relief cut out 37 facilitates insertion of rib portion 29.

Figure 2:
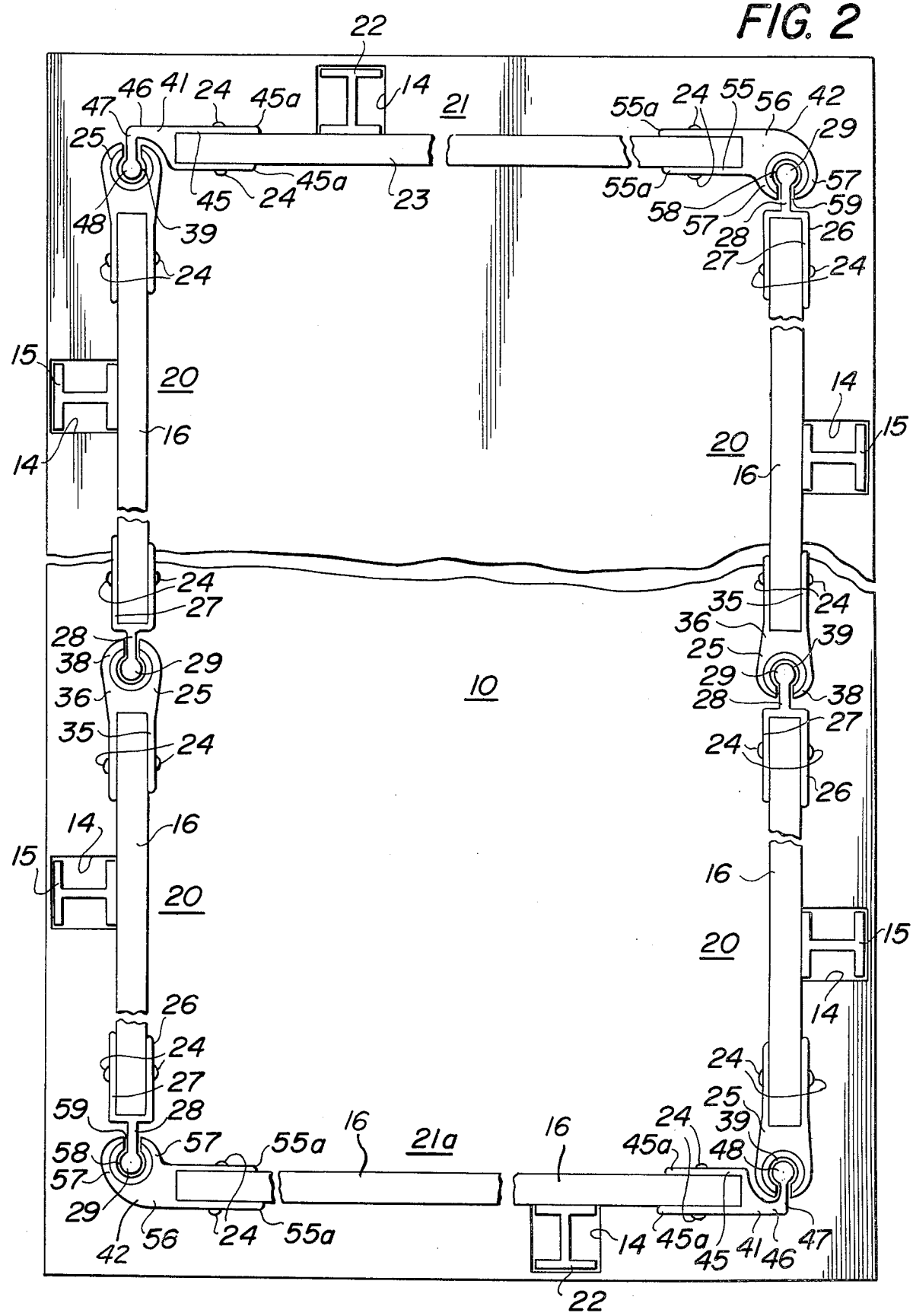
FIG. 2 is a top plan view illustrating the rack connectors of my invention.

Referring now to FIGS. 1 and 2, another embodiment of connectors is illustrated attached to the end racks 21 and 21a which includes a pair of male and female connectors 41 and 42 respectively attached to the ends of top boards 23 and 16 by rivets 24 and engaged with female and male connectors 25 and 26, respectively, from racks 20 on opposite sides of bed 10.

The connector 41 includes a U-shaped portion 45 with spaced parallel walls 45a for engagement with the outer faces of the topmost board 23 of an end rack 21, and held in place by rivets 24.

The connector 41 has a central body 46 integral with the U-shaped portion 45 with a flange 47 L-shaped in horizontal cross section extending around the corner. The connector 41 has a cylindrical vertical rib portion 48 detachably received in the cylindrical opening 39 of a female connector 25.

The connector 42 includes a U-shaped portion 55 with spaced parallel walls 55a for engagement with the outer faces of the topmost board 23 of the end rack 21 at the opposite end from the connector 41 and is held in position by rivets 24.

The connector 42 has an integral body portion 56 from which wings 57 extend with an opening 58 therebetween to receive the rib portion 29 of a connector 26 and with a slot 60 to receive the flange 28.

As illustrated in FIGS. 1 and 2 the racks 20 can be used on either side of the body 10 with the forwardly situated connector on one side of the body 10 being located toward the rear when it is shifted to the other side but with no necessity of rights and lefts due to the symmetry of the connectors.

The connectors 25, 26, 41 and 42 are preferably formed of aluminum as extrusions which in the preferred embodiments can be of a height of six (6) inches and cut from an extrusion of greater length.

If it is desired that one of the racks 20 be utilized as a gate 200 one of the male connectors 26 is modified by removing the flange 28 preferably by sawing and which can be a vertical distance of about one and one half inches and leaving the lower part of the cylindrical rib portion 28 to serve as a vertical hinge pin, thereby to provide male connector 126 as shown in FIGS. 4, 5 and 6. Additional connectors 25 and 126 are also provided on the bottom most board or slat 16.

A female connector 25 is modified by removing the bottom portion for a distance which is equal to the portion removed from connector 25 to form connector 125 and thus provide a modified female connector 126.

When it is desired to swing open the rack 200 it is lifted to disengage members 15 from sockets 14, the female connector 25 with the modified male connector 126 provides the hinge pin since the female connector 125 is disengaged from the male connector 26 on the adjacent board 16. The rack 200 can be swung back as desired and lowered with locking as explained above.

If desired the racks 20 can be solid with additional boards filling in the spaces between the boards 16 or a solid panel (not shown) can be substituted providing a rack structure suitable for hauling grain.

It is apparent that with the connectors provided the front and rear racks 21 and 21a are interchangeable and the racks 20 are freely interchangeable to accommodate various lengths of truck beds and the gate 200 provides easy access to the bed 11 at any location where it can be placed.

It will thus be seen that connectors have been provided with which the objects of the invention are achieved.

I claim:

1. Connectors for joining together of racks for flat bed trucks or trailers, which comprises
   a pair of male and female connectors for attachment respectively to each end of a rack of a length substantially less than said rack in vertical dimension and vertically detachably engaged with a pair of male and female connectors on adjacent racks,
   said male connector having a portion for attachment to one end of said rack, a rib portion and a connecting flange between said portions,
   said female connector having a portion for attachment to said rack at the end opposite to said male connector and a vertical socket portion of semi-circular configuration to receive said rib portion from a male connector of an adjacent rack, and
   said connectors being vertically movable for panel separation but restrained from horizontal movement with respect to each other.

2. Connectors as defined in claim 1 in which
   said attachment portion of said female connector includes a pair of wings extending therefrom which engage said rack.

3. Connectors as defined in claim 2 in which
   said wings extend from said attachment portion at an angle of 90°.

4. Connectors as defined in claim 1 in which
   said male connector has its flange and rib disposed at an angle of 90° from said attachment portion.

5. Connectors as defined in claim 1 in which
   said rib portion extends below the attachment portion of said male connector and provides a hinge pin.

6. Connectors as defined in claim 5 in which
   the rack on which said rib portion is carried has the female connector at the other end of a height corresponding to the height of said male connector above the hinge pin.

7. Connectors as defined in claim 1 in which
   said connectors are vertically disposed, and
   each of said male connectors is of uniform cross section between the top and bottom thereof.

8. Connectors as defined in claim 1 in which
   said connectors are vertically disposed, and
   each of said female connectors is of uniform cross section between the top and bottom thereof.

* * * * *